United States Patent [19]

Gill

[11] Patent Number: 5,127,539
[45] Date of Patent: Jul. 7, 1992

[54] CONTAINERS FOR LIQUIDS

[75] Inventor: David C. Gill, Keynsham, United Kingdom

[73] Assignee: Nomix Manufacturing Company Limited, United Kingdom

[21] Appl. No.: 525,975

[22] Filed: May 18, 1990

[30] Foreign Application Priority Data

May 26, 1989 [GB] United Kingdom ............... 8912224

[51] Int. Cl.$^5$ .............................................. B67D 3/00
[52] U.S. Cl. ................................. 220/530; 220/207; 222/541
[58] Field of Search ............. 220/530, 207, 361, 913; 222/80, 541

[56] References Cited

U.S. PATENT DOCUMENTS

| | | |
|---|---|---|
| D. 238,655 | 2/1976 | McKinney et al. . |
| D. 244,991 | 7/1977 | Weckman et al. . |
| 697,700 | 4/1902 | Alden . |
| 705,013 | 7/1902 | Baeuerle . |
| 1,632,933 | 6/1927 | Thornton . |
| 1,850,870 | 3/1932 | Featherstone . |
| 2,340,419 | 2/1944 | Nawoj et al. . |
| 2,776,076 | 1/1957 | Nunn ................................. 222/83.5 |
| 2,859,901 | 11/1958 | Ardito . |
| 3,018,970 | 1/1962 | Wittenberg et al. ............... 220/530 |
| 3,182,861 | 5/1965 | Nataf ................................. 222/541 X |
| 3,460,724 | 8/1969 | Chmela .............................. 222/541 |
| 3,572,660 | 3/1971 | Mahon et al. . |
| 4,052,986 | 10/1977 | Scaife ................................ 222/541 X |
| 4,152,378 | 5/1979 | Vcelka et al. ..................... 222/541 X |
| 4,319,701 | 3/1982 | Cambio .............................. 222/541 |
| 4,618,076 | 10/1986 | Silvenis . |
| 4,723,688 | 2/1988 | Munoz ................................. 222/88 |

FOREIGN PATENT DOCUMENTS

| | | |
|---|---|---|
| 300762 | 1/1989 | European Pat. Off. . |
| 399825 | 11/1990 | European Pat. Off. . |
| 399826 | 11/1990 | European Pat. Off. . |
| 2233634 | 1/1991 | United Kingdom . |
| WO86/00285 | 1/1986 | World Int. Prop. O. . |

Primary Examiner—Steven M. Pollard
Attorney, Agent, or Firm—Merchant, Gould, Smith, Edell, Welter & Schmidt

[57] ABSTRACT

Liquid delivery apparatus includes a container 138 for the liquid, the container 138 having a liquid outlet 150 for dispensing the liquid and a vent hole 53 for admitting air to the container 138 to replace dispensed liquid. The vent hole 53 is closed by a closure element 56 which is removable to expose the vent hole 53. When fitting the container 138 to a delivery device 2, the closure element 56 engages the delivery device 2 so as to remove the closure element 36 automatically to cause the vent hole 53 to be exposed.

6 Claims, 2 Drawing Sheets

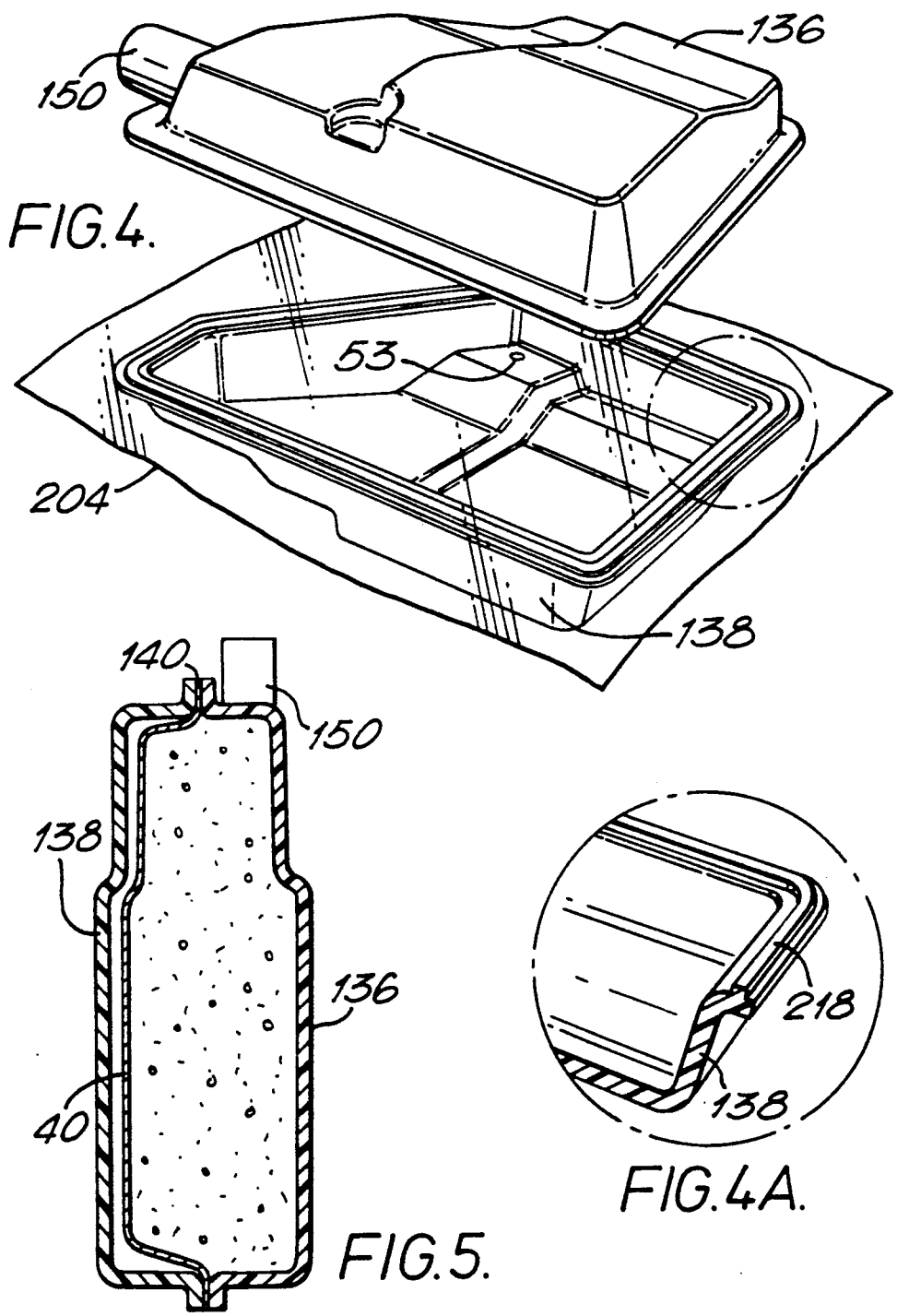

CONTAINERS FOR LIQUIDS

This invention relates to containers for liquids, and is particularly, although not exclusively, concerned with containers for use with apparatus for delivering herbicides over the ground.

There exist hand-held lances for delivering herbicide which comprise a handset and a delivery head which is connected to the handset by a tubular support. The handset is held by the operator, and the tubular support enables him to position the delivery head just above the ground to be treated.

European patent specification No. 0300762 discloses such a lance in which a container of herbicide is secured directly to the handset. The container comprises a rigid outer wall within which is disposed a flexible partition, dividing the interior of the container into two compartments. One of these compartments contains the herbicide, and the other communicates with the atmosphere through a vent hole in the part of the rigid wall bounding that compartment. An outlet is provided in the part of the rigid wall bounding the herbicide filled compartment. When fitted to the handset, the container is partially accommodated in a cavity in the handset, and the outlet is connected to an inlet fitting to enable herbicide to flow from the container to the delivery means.

A problem with such a container is that penetration of herbicide through the flexible partition, in the event of a defect in the partition, may result in the herbicide flowing to the outside through the vent hole. This can occur during storage or transport of the fluid container. Because herbicides, and other materials which may be packaged in similar containers, can be dangerous to humans or can otherwise constitute an environmental hazard, such leakage, even if relatively small, is undesirable.

According to the present invention, there is provided a container for receiving a liquid, the container being adapted for fitting to a delivery device for delivering the liquid, and having a liquid outlet, for dispensing the liquid to the delivery device, and a vent hole for admitting air to the container to replace dispensed liquid, the vent hole being closed by a closure element which is removable to expose the vent hole, characterized in that the closure element is positioned for engagement with the delivery device, as the container is fitted to the delivery device, thereby to be removed from the container to expose the vent hole.

The closure element may, for example, be an adhesive tape covering the vent hole, which tape is removed automatically as the container is fitted to the delivery means. In a preferred embodiment, however, the closure element is a projection, which may be moulded integrally with the wall of the container, which projection is broken off as the container is fitted to the delivery means.

According to another aspect of the present invention, there is provided a container for receiving a liquid, the container having a liquid outlet for dispensing the liquid and a vent hole for admitting air to the container to replace dispensed liquid, the vent hole being enclosed, on the exterior of the container, by a closure element which projects from the wall of the container and is breakable from the wall of the container to expose the vent hole.

For a better understanding of the present invention, and to show how it may be carried into effect, reference will now be made, by way of example, to the accompanying drawings, in which:

FIG. 4 is a diagrammatic exploded view of the container;

FIG. 4A is an enlarged view of part of the container shown in FIG. 4;

FIG. 5 is a sectional view of the filled container;

Figure 1:
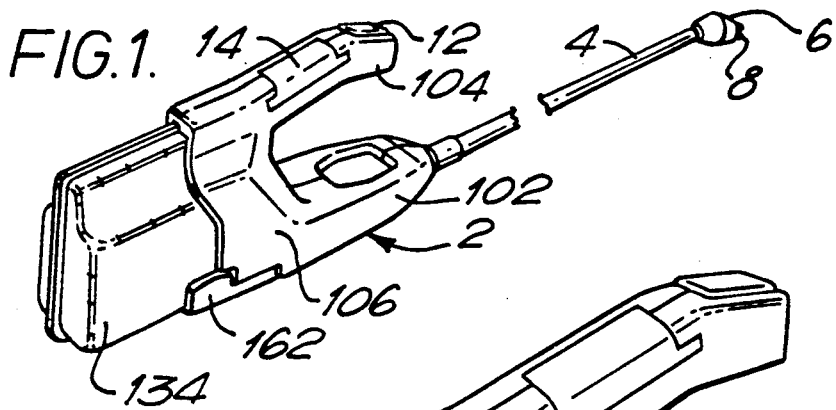
FIG. 1 shows a lance for delivering herbicide, fitted with a container of herbicide.

The lance shown in FIG. 1 comprises a handset 2 from which extends a rigid support member in the form of a tube 4. The tube 4 carries a delivery device in the form of a spraying head 6 which accommodates an electric motor (not shown) for driving a distribution element 8 in the form of a spinning disc.

A duct (not shown) extends from the handset 2 through the tube 4 to the spraying head 6. The handset 2 is provided with a valve (not shown) which can be operated by means of a trigger 12. A battery providing the source of power for the motor in the head 6 is accommodated in the handset 2, for example in a compartment 14 at the forward end of the handset.

The handset 2 comprises a somewhat U-shaped body made up of a first limb 102, which receives the tube 4, a second limb 104, which constitutes a handle member, and a connecting portion 106. The duct 10 enters the limb 102 and is connected to the outlet of the valve.

The connection portion 106 has a cavity which is occupied by the forward portion of a container 134 of herbicide. The rearward part of the container 134 projects from the cavity. The container comprises two casing halves 136 and 138 which adjoin one another at a seam 140. The two casing halves 136, 138 are substantially mirror images of one another, and so the container as a whole is generally symmetrical about the seam 140.

A flexible partition 40 (FIG. 5) extends between the casing halves 136 and 138, being secured to these casing halves at the seam 140. The interior of the container is thus divided into two compartments, one of which is defined between the flexible partition and the casing half 136, and the other of which is defined between the flexible partition and the casing half 138.

The casing half 136 is provided with an outlet fitting 150 which, when the container is fitted to the handset, engages an inlet fitting provided within the cavity so as to enable herbicide to flow from the container to the valve and hence to the head 8.

Figures 2A, 3:
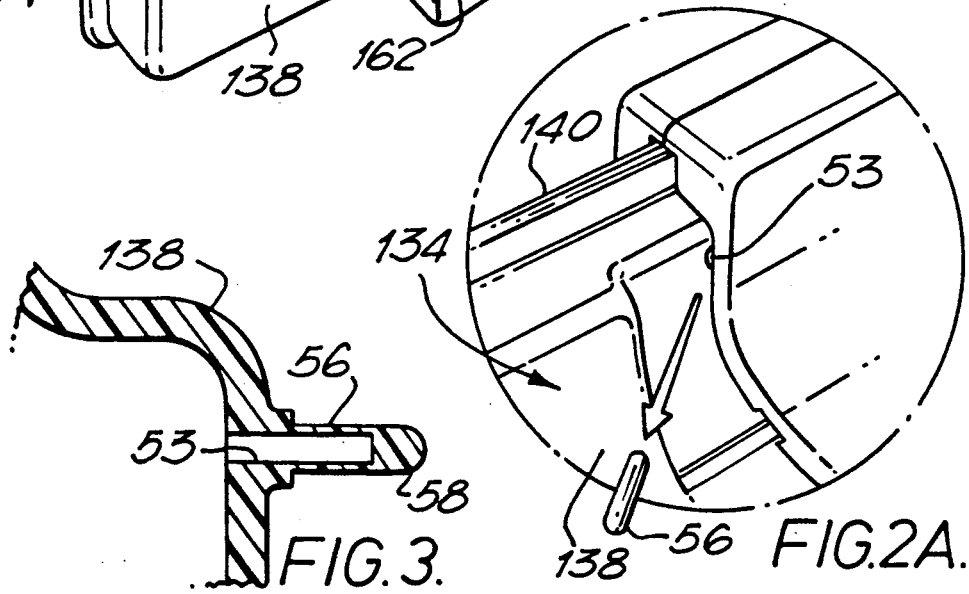
FIG. 2A is an enlarged fragmentary view of the junction between the handset and the container.
FIG. 3 is an enlarged sectional view of part of the wall of the container.

The casing half 138 is provided with a vent hole 53 (FIG. 3). The vent hole 53 is positioned on the casing half 138 so that, when the container is fitted to the handset 2, it is within the cavity. Before the container is first used, the vent hole 53 is enclosed, at the outside of the container, within a rigid tubular projection 56 formed on the casing half 138. The projection 56 has a closed end 58, so that the compartment defined between the flexible partition and the casing half 138 is wholly sealed from the surroundings.

The handset is provided with latching means in the form of a lever 162. This lever is freely pivoted, to the portion 102 of the handset. When the container 134 is inserted into the cavity, the lever engages within recesses 103 (FIG. 4) in the container to retain the container 134 within the cavity.

Figure 2:
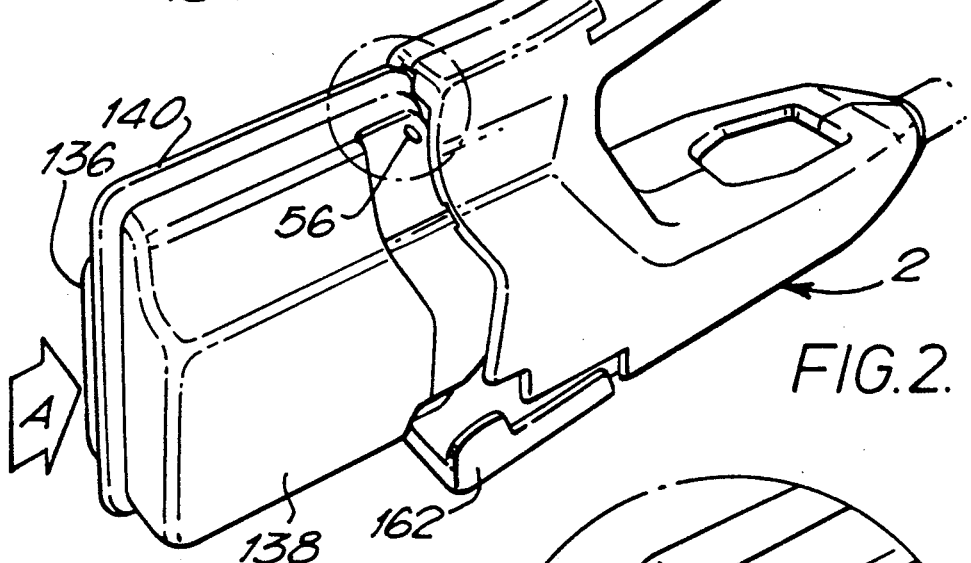
FIG. 2 is an enlarged view of a handset of the lance of FIG. 1, showing the container partially fitted.

For operation, the container 134 is inserted into the cavity in the direction of the arrow A in FIG. 2. During the initial stage of this insertion movement, the lever 162 is pivoted downwardly, for example under its own weight, as shown in FIG. 2.

As the container enters the cavity, the projection 56 engages the edge of the cavity and is broken off, to expose the vent hole 53, as shown in FIG. 2A. When the container 134 is pushed fully home, the lever 162 engages the recesses 103, as shown in FIG. 1, to retain the container firmly in the handset.

In operation, with the container 134 fitted to the handset 2, the lance is carried by an operator, by means of the handle member 104, with the spraying held 6 close to the ground. Actuation of the trigger 12 opens the valve in the limb 102 to allow herbicide to flow from the container 134 down a supply duct in the tube 4, to the spraying disc 8, so as to be distributed over the ground. As well as opening the valve, actuation of the trigger 12 also connects the motor in the head 6 to the battery in the limb 102 of the handset 2, so as to rotate the spraying disc 8.

As herbicide flows from the container 134, the flexible partition 40 deflects so as to reduce the size of the compartment in which the herbicide is accommodated, and to increase the size of the other compartment. To allow this to happen, air enters the compartment between the casing half 138 and the partition 40 through the vent hole 53.

It will be appreciated that, before the container 134 is first used, the projection 56 prevents any communication between the ambient surroundings and the compartment between the flexible partition 40 and the casing half 138. It sometimes happens that the flexible partition 40 may be defective, for example it may be punctured or inadequately sealed at its edges to the casing halves 136 and 138. In such circumstances, herbicide can flow across the partition 40 into the compartment which should contain only air. If the vent hole 53 were open in such circumstances, herbicide could leak from the container, which would be undesirable for several reasons. The provision of the projection 56 to seal the vent hole 53 thus avoids any possibility of leakage in this manner in the period between manufacture and filling of the container and its first use in distribution equipment.

It will be appreciated that, in some applications, it may be appropriate for the projection 56 to be broken off manually before the container is connected to delivery equipment, rather than being automatically broken off as the container is inserted, as shown in FIG. 2A.

I claim:

1. Apparatus for delivering a liquid, the apparatus comprising a delivery device and a container of liquid for fitting to the delivery device, the container having:
   a wall defining an interior of the container;
   a flexible partition which divides the interior of the container into first and second compartments;
   an outlet provided in the wall of the container for delivering liquid from the first compartment, the outlet having an axis;
   a vent hole in the wall of the container for admitting air into the second compartment;
   a closure element which closes the vent hole, the closure element projecting from the wall of the container in a direction transverse to the axis of the outlet, whereby arrest of the closure element, during displacement of the container in a direction parallel to the axis of the outlet for fitting the container to a delivery device, causes the closure element to be removed from the wall of the container to expose the vent hole.

2. Apparatus as claimed in claim 1, characterized in that the delivery device comprises a cavity into which part of the container extends when fitted to the delivery device, the closure element being engageable with a part of the delivery device surrounding the cavity.

3. A container for receiving a liquid, the container comprising:
   a wall defining an interior of the container;
   a flexible partition which divides the interior of the container into first and second compartments;
   an outlet provided in the wall of the container for delivering liquid from the first compartment, the outlet having an axis;
   a vent hole in the wall of the container for admitting air into the second compartment;
   a closure element which closes the vent hole, the closure element projecting from the wall of the container in a direction transverse to the axis of the outlet, whereby arrest of the closure element, during displacement of the container in a direction parallel to the axis of the outlet for fitting the container to a delivery device, causes the closure element to be removed from the wall of the container to expose the vent hole.

4. A container according to claim 3, characterized in that the closure element projects from the wall of the container and is breakable from the wall of the container, upon engagement with the delivery device, to expose the vent hole.

5. A container according to claim 4, characterized in that the closure element is moulded integrally with the container.

6. A container as claimed in claim 4, characterized in that the closure element is tubular, the interior of the closure element communicating at one end with the vent hole, and the end of the closure element away from the vent hole being closed.

* * * * *